(12) United States Patent
Hori et al.

(10) Patent No.: US 6,377,533 B1
(45) Date of Patent: Apr. 23, 2002

(54) RECORDING DEVICE UTILIZING INTER-SYMBOL INTERFERENCE

(75) Inventors: Yoshihiro Hori, Gifu; Masakazu Taguchi, Kawasaki, both of (JP)

(73) Assignees: Sanyo Electric Co., Ltd., Osaka; Fujitsu Limited, Kawasaki (JP)

( * ) Notice: Subject to any disclaimer, the term of this patent is extended or adjusted under 35 U.S.C. 154(b) by 0 days.

(21) Appl. No.: 09/743,266

(22) PCT Filed: Aug. 4, 1999

(86) PCT No.: PCT/JP99/04244

§ 371 Date: Jan. 8, 2001

§ 102(e) Date: Jan. 8, 2001

(87) PCT Pub. No.: WO00/08644

PCT Pub. Date: Feb. 17, 2000

(30) Foreign Application Priority Data

Jul. 8, 1998 (JP) .............................. 10-225028

(51) Int. Cl.$^7$ ................................. G11B 5/76
(52) U.S. Cl. ................................. 369/59.24; 369/47.15
(58) Field of Search ............................. 369/47.21, 47.2, 369/59.23, 59.24, 59.25, 59.26, 59.27, 124.07, 124.08, 124.09, 47.15, 47.14, 47.18, 53.31

(56) References Cited

FOREIGN PATENT DOCUMENTS

| JP | 8-7495 | 1/1996 |
| JP | 8-223047 | 8/1996 |

*Primary Examiner*—Paul W. Huber
(74) *Attorney, Agent, or Firm*—Armstrong, Westerman & Hattori, LLP

(57) ABSTRACT

A recording device according to the present invention has a function (202, 206, 207) of dividing precoded record data into data blocks of a prescribed length to adjust to a magneto-optical disk (3) and adding an intrinsic pattern before and after the data blocks. As the intrinsic pattern, a pattern which reduces a decoding error of maximum likelihood decoding at an end of each data block is used. Therefore, even when data is inserted after preceding, code correlation of a precoded signal can be maintained at a location where division is performed.

45 Claims, 8 Drawing Sheets

| DATA BLOCK N | PRE-WRITE FIELD CORRESPONDING TO DATA BLOCK N+1 |
|---|---|
| D(511)=0 | 1100 |
| D(511)=1 | 0011 |

| DATA BLOCK N+1 | POST-WRITE FIELD CORRESPONDING TO DATA BLOCK N |
|---|---|
| D(0)=0 | 0011 |
| D(0)=1 | 1100 |

*FIG.8A*

| DATA BLOCK N | PRE-WRITE FIELD CORRESPONDING TO DATA BLOCK N+1 |
|---|---|
| D(511)=0 | 1100 |
| D(511)=1 | 0011 |

*FIG.8B*

| DATA BLOCK N | POST-WRITE FIELD CORRESPONDING TO DATA BLOCK N |
|---|---|
| D(511)=0 | 0011 |
| D(511)=1 | 1100 |

RECORDING DEVICE UTILIZING INTER-SYMBOL INTERFERENCE

TECHNICAL FIELD

The present invention relates to a recording device for recording data on a magneto-optical recording medium.

BACKGROUND ART

A magneto-optical recording and reproducing system can be regarded as a Gaussian low pass filter if the entire part is considered to be a base band transmission line. Therefore, an increase in the recording density causes inter-symbol interference between the minimum signals of adjacent recording regions and thus deteriorates a regenerated signal waveform.

As one of the methods of preventing such inter-symbol interference, the method of correcting the frequency characteristic of the entire transmission line to a Nyquist characteristic by providing an equalizer at a later stage of a magneto-optical recording and reproducing system is known. However, since the transmission band is limited in this method, it is difficult to apply the method to recording and reproducing of a high density magneto-optical disk.

Therefore, the PR (Partial Response) method in which inter-symbol interference is not eliminated but a signal is transmitted with inter-symbol interference is employed for recording and reproducing of a high density magneto-optical disk.

A transmission system in which the PR method is applied to a magneto-optical disk will be described with reference to FIG. 9. Referring to FIG. 9, a precoder 701, a magneto-optical disk 704 in which a signal is recorded and regenerated by an optical pickup 702 and a magnetic head 703, and an equalizer 705 form the transmission system. Precoder 701 eliminates error propagation caused when a code that is transmitted by the PR method is decoded. Equalizer 705 performs waveform equalization of an RF signal regenerated from magneto-optical disk 704. That results in inter-symbol interference having known correlation as the transmission system.

Multi-value discrimination portion 706 estimates the most possible state of a signal by maximum likelihood decoding. More specifically, the amplitude correlation of the PR method is utilized to refer to the state of a decoded signal before time for identification (or before and after identification time) and to estimate the most analytically possible value to be the signal state at the identification time.

In signal transmission of the PR method, it is desirable in some cases to divide a precoded signal (signal after being precoded) into blocks of a prescribed bit number and to insert an intrinsic pattern or the like of the drive system before and after each block. For example, magneto-optical disk 704 may be caused to have a clock component in advance and data may be recorded on locations other than that of the clock component.

If data is inserted after precoding, however, the code correlation of a precoded signal cannot be maintained at a location where division into blocks is found. Then, a decoding error occurs in maximum likelihood decoding which utilizes signal correlation before and after identification time.

DISCLOSURE OF THE INVENTION

An object of the present invention is to provide a recording device capable of inserting data in a precoded signal without causing a decoding error of data.

According to one aspect of the present invention, a recording device for recording data on a recording medium of a method in which data is reproduced by utilizing inter-symbol interference includes precode means for precoding input data to adjust to the recording medium, format means for dividing the precoded data into a plurality of data blocks and adding a corresponding intrinsic pattern to an end of each of the plurality of data blocks, pattern determination means for determining the corresponding intrinsic pattern for each of the plurality of data blocks and outputting the corresponding intrinsic pattern to the format means, and record means for recording an output of the format means on the recording medium, wherein the pattern determination means determines the corresponding intrinsic pattern to reduce a decoding error of data at each end of the plurality of data blocks. Preferably, the pattern determination means selects one of predetermined at least two intrinsic patterns as the corresponding intrinsic pattern for each of the plurality of data blocks. Preferably, the corresponding intrinsic pattern is formed of such data among data included in a data block adjacent to a corresponding data block that is adjacent to an end of the corresponding data block before division into blocks.

Therefore, according to the above described recording device, even when an intrinsic pattern is inserted and recorded for precoded data and the recorded data is read out and subjected to waveform equalization to perform maximum likelihood decoding, code correlation at a location where division into blocks is performed can be maintained. It is therefore possible to prevent occurrence of the decoding error of maximum likelihood decoding at the block division location.

According to another aspect of the present invention, a recording device for recording data on a recording medium of a method in which data is reproduced by utilizing inter-symbol interference includes precode means for precoding input data to adjust to the recording medium, format means for dividing the precoded data into a plurality of data blocks and adding a corresponding first intrinsic pattern to a front end of each of the plurality of data blocks and a corresponding second intrinsic pattern to a rear end of each of the plurality of data blocks, pattern determination means for determining the corresponding first intrinsic pattern and the corresponding second intrinsic pattern for each of the plurality of data blocks, and record means for recording an output of the format means on the recording medium, wherein the pattern determination means determines the corresponding first intrinsic pattern according to the rearmost data of a data block located immediately before a corresponding data block, and determines the corresponding second intrinsic pattern according to the rearmost data of the corresponding data block. Preferably, the corresponding second intrinsic pattern is combined with the rearmost data of the corresponding data block to generate traceback. Preferably, the rearmost data of the corresponding first intrinsic pattern is identical to the rearmost data of the data block located immediately before the corresponding data block.

Therefore, according to the above described recording device, even when an intrinsic pattern is inserted and recorded for precoded data and the recorded data is read out and subjected to waveform equalization to perform maximum likelihood decoding, code correlation at a location where division into blocks is performed can be maintained. It is therefore possible to prevent occurrence of the decoding error of maximum likelihood decoding at the block division location. When an intrinsic pattern which generates traceback is inserted, maximum likelihood decoding can be completed for each data block.

The foregoing and other objects, features and advantages of the present invention will become apparent from the following details of the present invention understood in conjunction with the attached drawings.

BRIEF DESCRIPTION OF THE DRAWINGS

FIGS. 8A and 8B show tables referred to during data formatting in a third embodiment.

BEST MODES FOR CARRYING OUT THE INVENTION

First Embodiment

Figure 1:
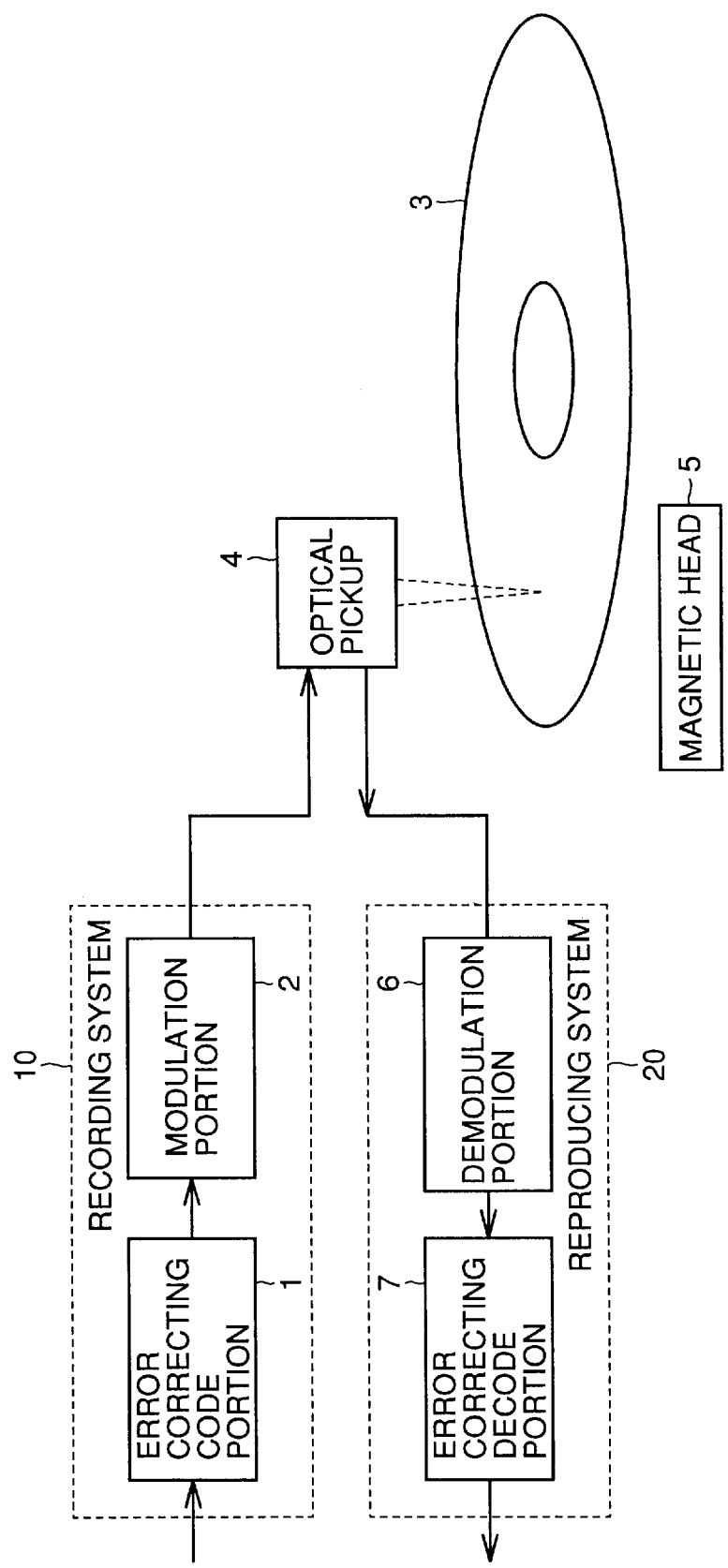
FIG. 1 is a conceptual diagram illustrating an overall configuration of a recording/reproducing device according to a first embodiment.

Referring to FIG. 1, a recording/reproducing device according to a first embodiment includes a recording system 10 including an error correcting code portion 1 and a modulation portion 2, an optical pickup 4 and a magnetic head 5 arranged for a magneto-optical disk 3, and a reproducing system 20 including a demodulation portion 6 and an error correcting decode portion 7.

Error correcting code portion 1 adds an error correcting code to received user data. An output of error correcting code portion 1 is digitally modulated in modulation portion 2. The digitally modulated data is recorded on magneto-optical disk 3 by optical pickup 4 and magnetic head 5.

The record data recorded on magneto-optical disk 3 is read out by optical pickup 4, and digitally demodulated in demodulation portion 6. The digitally demodulated data is error-corrected in error correcting decode portion 7 and provided as an output.

Figure 2:
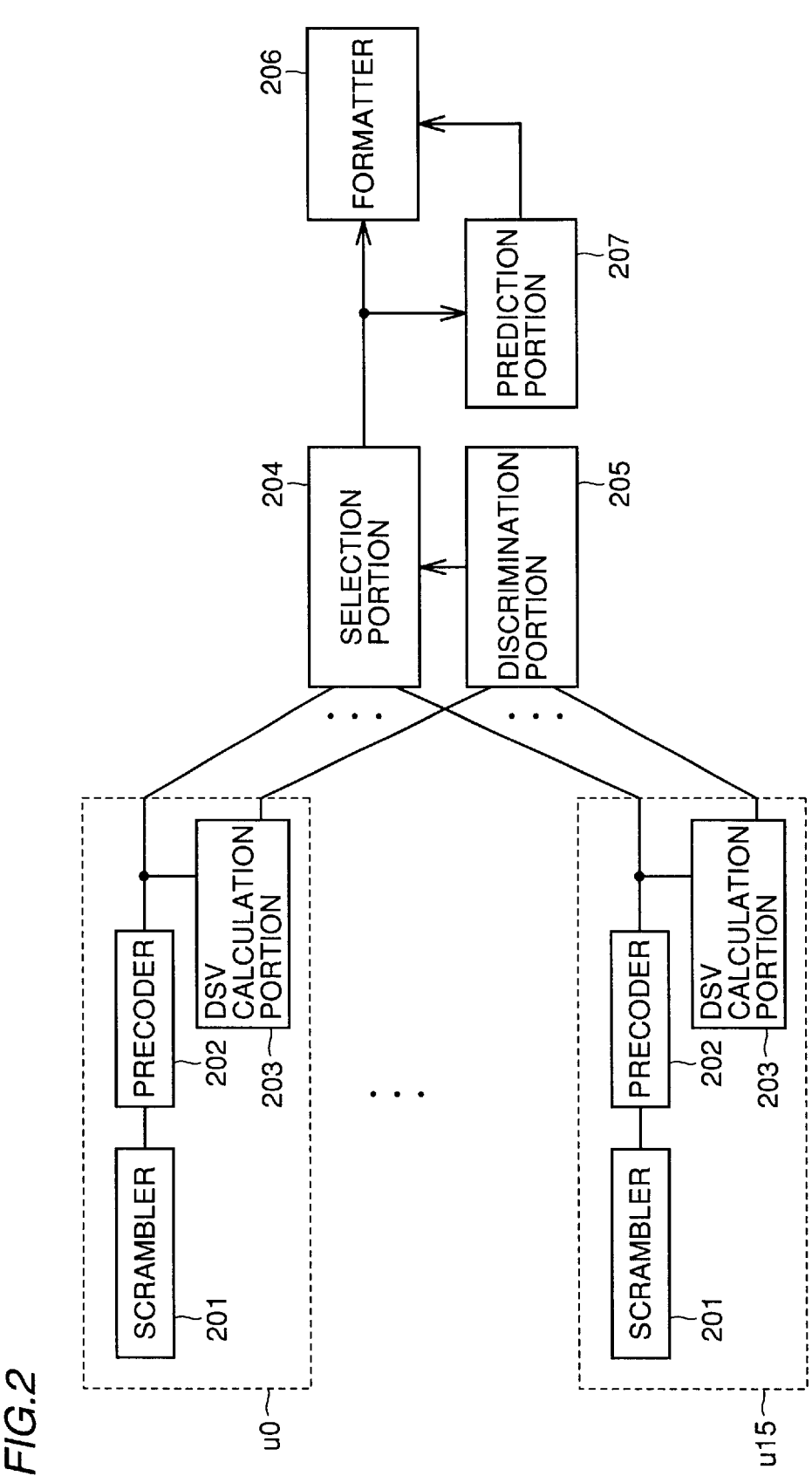
FIG. 2 is a conceptual diagram showing one example of the configuration of a modulation portion 2.

As shown in FIG. 2, modulation portion 2 includes modulation units U0 to U15, a discrimination portion 205 for discriminating data having the smallest amount of DC component by comparing the DSVs (digital sum values) of data modulated by modulation units U0 to U15, a selection portion 204 for selecting digitally modulated data output from one of modulation units U0 to U15 based on the discrimination result of discrimination portion 205, a formatter 206 for adding a pattern intrinsic to the recording/reproducing device to the selected data, and a prediction portion 207 for controlling formatter 206 based on the selected data.

Each of modulation units U0 to U15 includes a scrambler 201, a precoder 202 and a DSV calculation portion 203. Scramblers 201 use mutually different scramble keys to scramble data and add the scramble keys to data. Precoders 202 precode the scrambled data to prevent error propagation. DSV calculation portions 203 calculate the DSVs of the precoded data.

Data output from error correcting code portion 1 is converted to 16 types of precode data in modulation units U0 to U15. Discrimination portion 205 receives outputs of respective DSV calculation portions 203 in modulation units U0 to U15 and performs the above described discrimination. In selection portion 204, precode data having the smallest amount of DC component is selected among the 16 types of precode data. Formatter 206 divides the selected data into data blocks (the operation is referred to as block division), and adds an intrinsic pattern determined by prediction portion 207 to each data block.

Figure 3:
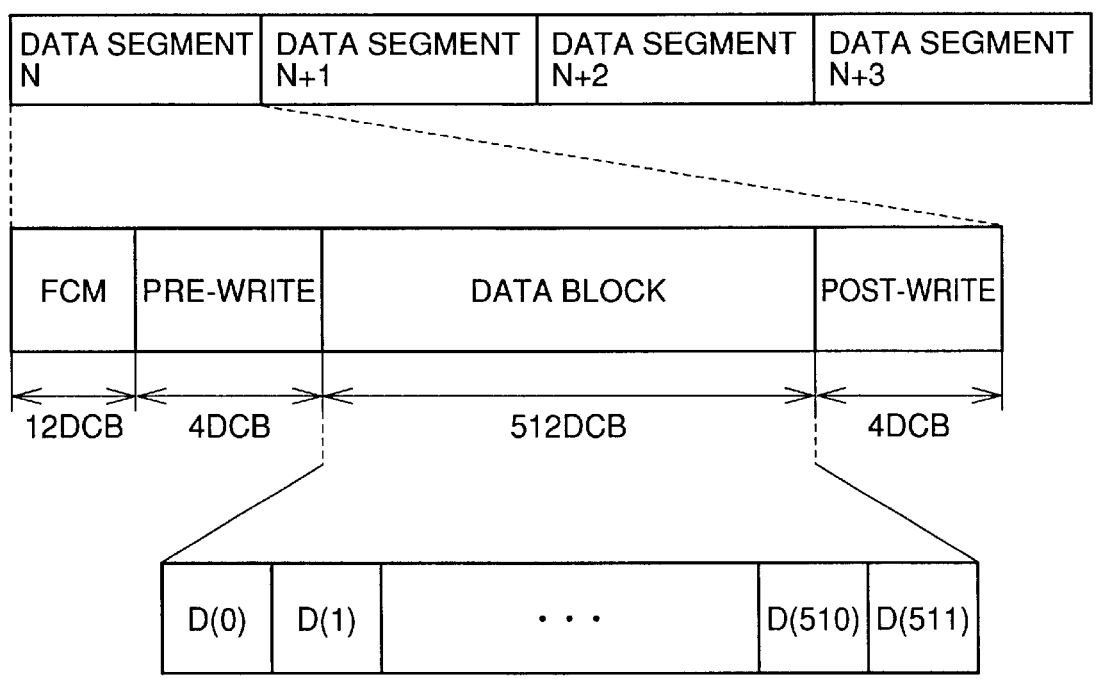
FIG. 3 is a conceptual diagram showing a data format of a user data area in the first embodiment.

The storage area of magneto-optical disk 3 is formed of a user data area for recording user data, and a system data area for recording data intrinsic to the recording/reproducing device. Input user data is divided into data blocks of 512 DCB (data channel bit) units in formatter 206 as shown in FIG. 3. Data forming each data block is referred to as Data D (0) to D (511).

A pre-write field, a post-write field and an FCM (Fine Clock Mark) field are added before and after the data block. The pre-write field and the post-write field both have 4 DCB units, and the FCM field has 12 DCB units.

A data block, a pre-write field, a post-write field and an FMC field constitute a data segment. In FIG. 3, data segments N to N+3 are representatively shown. In the following, a data block forming a data segment K (K is an integer of at least 0) is referred to as a data block K.

On tracks of magneto-optical disk 3, marks for clock generation (FCMs: fine Clock Marks) are previously formed as physical forms. An FCM field corresponds to an area where the FCM is formed. In a pre-write field and a post-write field, fixed patterns described below are recorded as data based on an indication from prediction portion 207. It is noted that the pre-write field and the post-write field are arranged for buffering so that part of the data block (front or rear portion) does not enter an FCM when the recording position of the data block is slightly shifted from that of ordinary cases. In other words, the pre-write field and the post-write field function as buffering data to connect the FCM and data. The user data formatted in this manner is recorded on magneto-optical disk 3.

Figure 4:
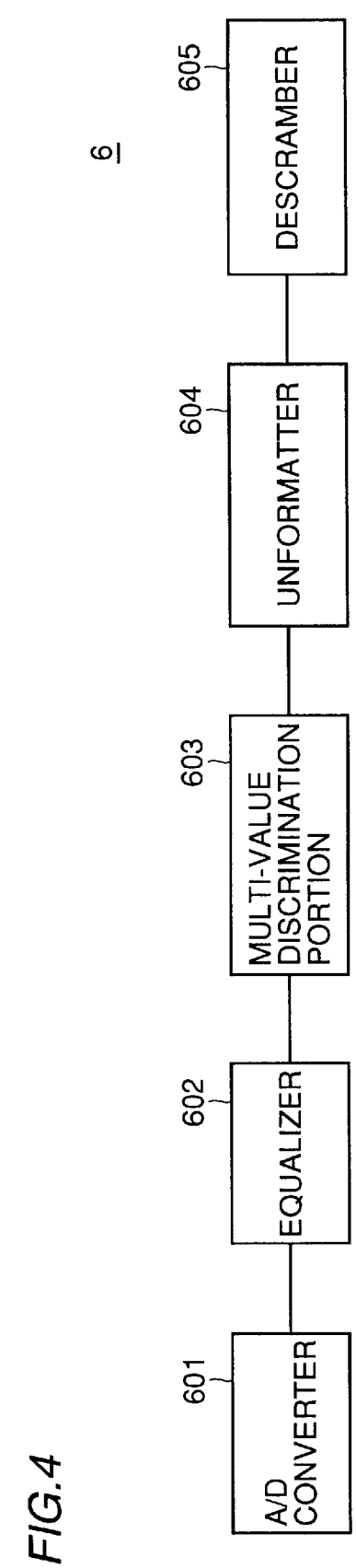
FIG. 4 is a block diagram showing one example of the configuration of a demodulation portion 6.

As shown in FIG. 4, demodulation portion 6 shown in FIG. 1 includes an A/D converter 601 for digitally converting an RF signal regenerated by optical pickup 4, an equalizer 602 for performing waveform equalization of the regenerated RF signal to attain a desired characteristic, a multi-value discrimination portion 603 for performing maximum likelihood decoding to demodulate binary data according to the amplitude level of an output of equalizer 602, an unformatter 604 for extracting user data, and a descramber 605 for descrambling the extracted user data based on scramble header information.

Now, formatting by prediction portion 207 and formatter 206 in the first embodiment will be described with respect to data blocks N and N+1, as an example. In the first embodiment, an intrinsic pattern determined by the last data D (511) included in data block N of data segment N is inserted in a pre-write field corresponding to data block N+1 (data segment N+1). In a post-write field corresponding to data block N (data segment N), an intrinsic pattern determined by the first data D (0) included in data block N+1 of data segment N+1 is inserted.

Figures 5A, 5B, 6:
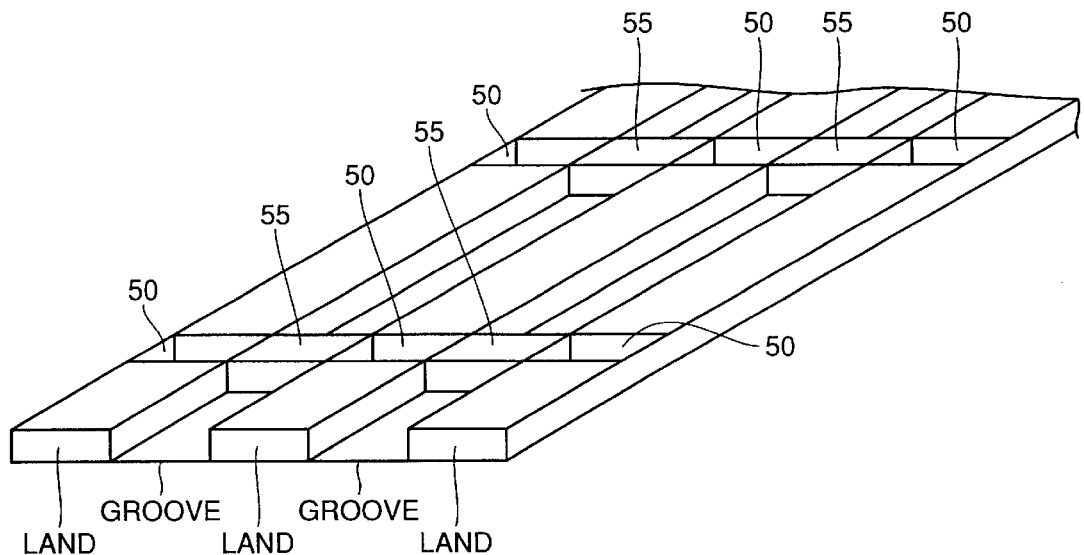
FIGS. 5A and 5B show tables referred to during data formatting in the first embodiment.
FIG. 6 is a conceptual diagram illustrating the structure of a magneto-optical disk 3.

More specifically, as shown in the tables (conversion rule) of FIGS. 5A and 5B, if intrinsic patterns corresponding to a pre-write field are "1100" and "0011" and the last data D (511) in data block N is "0," then "1100" is inserted in the pre-write field corresponding to data block N+1. If the last data D (511) is "1," then "0011" is inserted in the pre-write field corresponding to data block N+1.

If intrinsic patterns corresponding to a post-write field are "0011" and "1100" and the first data D (0) in data block N+1 is "0," then "0011" is inserted in the post-write field corresponding to data block N. If the first data D (0) is "1," then "1100" is inserted in the post-write field corresponding to data block N.

Prediction portion 207 refers to the tables (conversion rule) of FIGS. 5A and 5B to determine an intrinsic pattern. Formatter 206 inserts, based on an indication from prediction portion 207, an intrinsic pattern in a pre-write field and a post-write field before and after a data block.

By thus inserting, into a portion (a block division location) before and after block data obtained by block division, an intrinsic pattern determined by data at an end of an adjacent data block, code correlation at block division location D (0) and D (511) is maintained.

Therefore, without causing a decoding error in maximum likelihood decoding in multi-value discrimination portion 603, it becomes possible to insert particular intrinsic patterns in precoded data.

Besides the above described data format, the present invention is effective for a stream having such a data format that precoded data is divided into data blocks of a prescribed length and a particular pattern is inserted in each data block.

It is noted that an intrinsic pattern may be inserted not only before and after a data block but before or after the data block according to the above described conversion rule.

Second Embodiment

A data format in a second embodiment will be described. In magneto-optical disk 3, grooves (trenches) shown in FIG. 6 are formed in a spiral manner. In a groove, convex portions 55 are formed at prescribed intervals. In a land located between adjacent grooves, concave portions 50 are formed at prescribed intervals. Concave portions 50 and convex portions 55 are formed as clock marks at the time of manufacturing. User data is recorded on the grooves and the lands other than concave portions 50 and convex portions 55.

Figure 7:
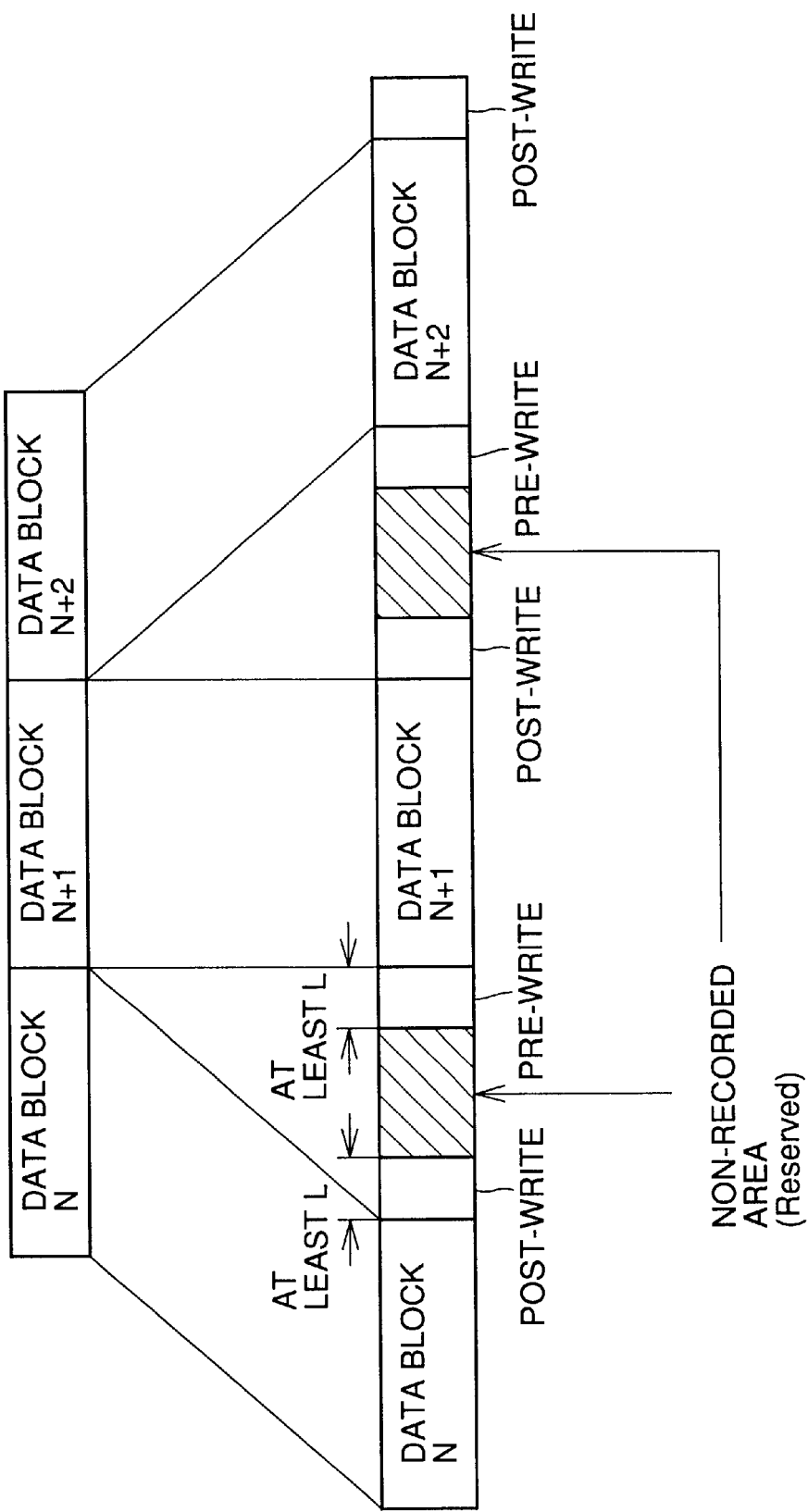
FIG. 7 is a conceptual diagram showing a data format in a second embodiment.
Figure 9:
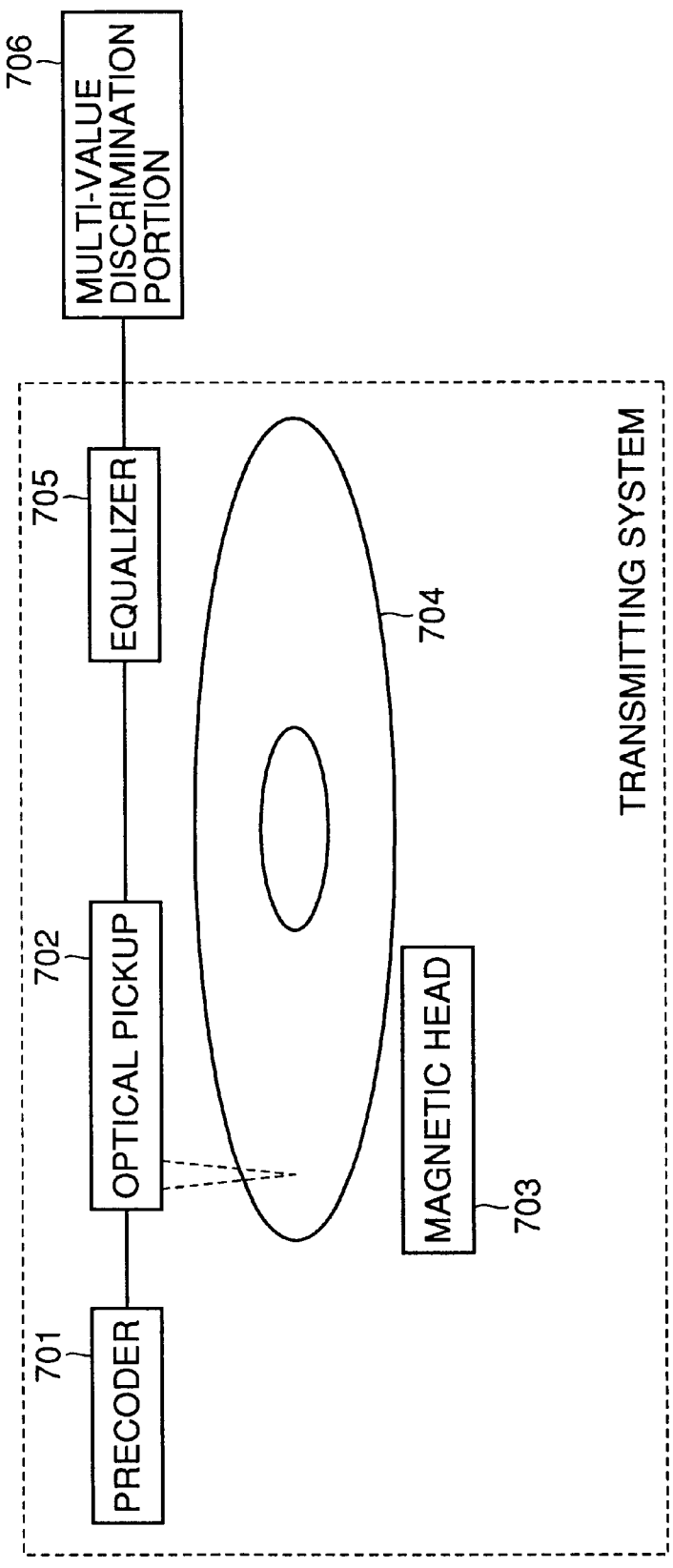
FIG. 9 is a conceptual diagram illustrating a transmission system corresponding to a conventional PR method.

As shown in FIG. 7, formatter 206 adds a non-recorded area (Reserve) between data blocks, a pre-write field immediately before each data block, and a post-write field immediately after each data block. The nonrecorded area (Reserve) corresponds to above described concave portion 50 and convex portion 55.

In the second embodiment, data is divided into data blocks of a prescribed length after precoding of a constraint length L+1 (for L is a natural number) in precoder 202.

Prediction portion 207 performs a control operation to insert particular intrinsic patterns in pre-write and post-write fields. In this case, the fixed pattern length is at least L, and the relationship between a postwrite pattern length and a pre-write pattern length may not particularly be limited but they may be the same or different.

Now, formatting by prediction portion 207 and formatter 206 in the second embodiment will be described by taking data blocks N and N+1 as an example. In the second embodiment, an intrinsic pattern starting with a pattern of successive repetition of the foremost data of data block N+1 is inserted in a post-write field corresponding to data block N. The number of repetition is at least L+1. In a pre-write field corresponding to data block N+1, an intrinsic pattern ending with the rearmost data of data block N is inserted.

In a PR (1, 1) method, for example, if the first data of data block N+1 is "0," then the front portion of an intrinsic pattern to be inserted in a post-write field corresponding to data block N is a pattern starting with "0." If the rearmost data of data block N is "0," then the rear pattern of an intrinsic portion to be inserted in a pre-write field corresponding to data block N+1 is a pattern ending with "0."

In other words, prediction portion 207 designates an intrinsic pattern, which maintains code correlation at a block division location, according to preceding. Based on it, formatter 206 inserts an intrinsic pattern before and after a data block. Therefore, without causing a decoding error in maximum likelihood decoding in multi-value discrimination portion 603, it becomes possible to insert particular data in precoded data.

An intrinsic pattern may be inserted not only before and after a data block but before or after the data block according to the above described conversion rule.

Third Embodiment

In the above described first and second embodiments, the transmission coefficient H(D) of the transmission system for reproducing data recorded on magneto-optical disk 3 provides waveform equalization in equalizer 602 to satisfy the expressions (1) and (2). The signal transmission scheme represented by such a transmission coefficient H (D) is referred to as the PR (1, 1) method.

$$H(D)=1+D \tag{1}$$

$$D=e^{jwT} \tag{2}$$

In the expressions (1) and (2), symbol T is a bit cycle, symbol w is a frequency, and symbol D is a delay operation element in bit cycle T.

On the other hand, the transmission coefficient H (D) of the transmission system may provide waveform equalization in equalizer 602 to satisfy the expressions (3) and (4).

$$H(D)=(1+D)^2 \tag{3}$$

$$D=e^{jwT} \tag{2}$$

The signal transmission scheme represented by such a transmission coefficient H (D) is referred to as the PR (1, 2, 1) method. The third embodiment is directed to signal transmission of the PR (1, 2, 1) method. The data format is as described with respect to FIG. 3.

Now, formatting by prediction portion 207 and formatter 206 in the third embodiment will be described by taking data blocks N and N+1 as an example. In the third embodiment, an intrinsic pattern determined according to the last data D (511) included in data block N of data segment N is inserted in a pre-write field corresponding to data block N+1 (data segment N+1). This is performed for the purpose of maintaining code correlation of the PR method similarly to the conversion rule described with respect to the first embodiment.

On the other hand, in a post-write field corresponding to data block N (data segment N), an intrinsic pattern determined according to the last data D (511) included in data block N of data segment N is inserted. This is performed for the purpose of reliably preventing a decoding error of maximum likelihood decoding by generating traceback on the boundary between a post-write field and a data block.

In maximum likelihood decoding in signal transmission of the PR method, the most possible one of paths led to each state at each time is selected as a "survived path." If a particular pattern is input at this time, the "survived path" and the state as a base are uniquely determined (merged). Since the path can be followed (traced back) from the uniquely determined state, a path found before the particular pattern is input can be determined. Therefore, when a particular pattern is inserted before and after a data block, a path before insertion can be uniquely determined.

In maximum likelihood decoding in signal transmission of the PR (1, 2, 1) method, input of a signal "000" or "111" generates traceback. The traceback is generated at a post-write field portion. In order to do so, an intrinsic pattern to be inserted in a post-write field of data segment N is determined according to the last data D (511) of data segment N.

More specifically, as shown in FIGS. 8A and 8B, if intrinsic patterns corresponding to a pre-write field are "1100" and "0011" and the last data D (511) of data block N is "0," then "1100" is recorded on the pre-write field corresponding to data block N+1. If the last data D (511) is "1," then "0011" is recorded on the pre-write field corresponding to data block N+1. Thus, code correlation of the PR method is maintained.

If intrinsic patterns corresponding to a post-write field are "0011" and "1100" and the last data D (511) of data block N is "0," then "0011" is recorded on the post-write field corresponding to data block N. If the last data D (511) is "1," then "1100" is recorded on the post-write field corresponding to data block N. Therefore, it becomes possible to prevent occurrence of a decoding error in maximum likelihood decoding, and complete maximum likelihood decoding for each data block by generation of traceback.

It is noted that an intrinsic pattern may be inserted not only before and after a data block but before or after the data block according to the above described conversion rule.

Fourth Embodiment

The configuration shown in the second embodiment was provided as an extension of the first embodiment. Likewise, the structure of a fourth embodiment described below can be provided as an extension of the above described third embodiment. The conversion rule described in the third embodiment is applied to the stream of a data format in which precoded data of a constraint length of L+1 (L is a natural number) is divided into data blocks of a prescribed length and a particular pattern is inserted between data blocks.

As described with respect to FIG. 7, formatter 206 adds a non-recorded area (Reserve) between data blocks, a pre-write field immediately before each data block, and a post-write field immediately after each data block. Prediction portion 207 performs a control operation to insert a particular intrinsic pattern in a pre-write field and a post-write field.

Now, formatting by prediction portion 207 and formatter 206 in the fourth embodiment will be described by taking data blocks N and N+1 as an example. In the fourth embodiment, an intrinsic pattern determined according to the rearmost data of data block N located immediately before is inserted in a pre-write field corresponding to data block N+1. Thus, code correlation is maintained.

In a post-write field corresponding to data block N, such a pattern is inserted that has successive repetition of the rearmost data of data block N. The number of repetition is at least L if the constraint length is L+1. Since traceback is generated on the boundary between the post-write field and the data block as a result, a decoding error of maximum likelihood decoding can be prevented reliably.

A case of the PR (1, 2, 1) method will be described. Assume that the data bit string representing data in a data block is D(0), . . . , D(J) (for J is a natural number). An intrinsic pattern to be inserted in the pre-write field corresponding to data block N+1 includes 2 bits formed of the last bit of data block N and a bit immediately before the last bit (that is, D(J) and D(J−1)). Furthermore, an intrinsic pattern to be inserted in the post-write field corresponding to data block N includes 2 bits formed of the last bit of data block N and a bit immediately before the last bit (that is, D(J) and D(J−1)).

Therefore, even when precoded data is divided into blocks to insert and record an intrinsic pattern and the recorded data is read out to perform waveform equalization and maximum likelihood decoding, occurrence of a decoding error in maximum likelihood decoding at each data block end can be prevented. When the rearmost data of a data block located immediately before is added to the front portion of the following data block and data which generates traceback at the rearmost portion of a data block is added at the rearmost portion of the data block, maximum likelihood decoding can be completed for each data block.

An intrinsic pattern may be inserted not only before and after a data block but before or after the data block according to the above described conversion rule.

It should be understood that the embodiments disclosed herein are illustrative and not restrictive in any detail. It is to be noted that the scope of the present invention which is defined not by the above description of the embodiments but by the claims covers all modifications within the range equivalent to the claims.

What is claimed is:

1. A recording device for recording data on a recording medium using a method in which data is reproduced by utilizing inter-symbol interference, comprising:

a precoder for preceding input data to adjust to said recording medium;

a formatter for dividing said precoded data into a plurality of data blocks and adding a corresponding intrinsic pattern to an end of each of said plurality of data blocks;

a pattern determination unit for determining said corresponding intrinsic pattern for the end of each of said plurality of data blocks; and a record unit for recording an output of said formatter on said recording medium, wherein said pattern determination unit determines said corresponding intrinsic pattern to reduce a decoding error of data at the end of each of said plurality of data blocks, and wherein said pattern determination unit selects, as said corresponding intrinsic pattern, one of predetermined at least two intrinsic patterns for each of said plurality of data blocks.

2. The recording device according to claim 1, wherein said corresponding intrinsic pattern is formed of such data among data included in a data block adjacent to a corresponding data block that is adjacent to an end of said corresponding data block before division into said blocks.

3. The recording device according to claim 1, wherein said corresponding intrinsic pattern is combined with data at an end of a corresponding data block to generate traceback.

4. The recording device according to claim 3 wherein the end of each of said plurality of data blocks is a rear end of each of said plurality of data blocks, and
foremost data of said corresponding intrinsic pattern is identical to rearmost data of said corresponding data block.

5. The recording device according to claim 3, wherein the end of each of said plurality of data blocks is a rear end of each of said plurality of data blocks, and
said corresponding intrinsic pattern is "1100" when rearmost data of said corresponding data block is "1," and "0011" when rearmost data of said corresponding data block is "0."

6. The recording device according to claim 3, wherein the end of each of said plurality of data blocks is a rear end of said plurality of data blocks, and
foremost data of said corresponding intrinsic pattern has at least two repetition of rearmost data of said corresponding data block.

7. The recording device according to claim 1, wherein the end of each of said plurality of data blocks is a front end of each of said plurality of data blocks, and
said pattern determination unit determines said corresponding intrinsic pattern according to rearmost data of a data block located immediately before a corresponding data block.

8. The recording device according to claims 7, wherein said corresponding intrinsic pattern is "0011" when the rearmost data of the data block located immediately before said corresponding data block is "1," and "1100" when the rearmost data of the data block located immediately before said corresponding data block is "0."

9. The recording device according to claim 1, wherein the end of each of said plurality of data blocks is a rear end of each of said plurality of data blocks, and
said pattern determination unit determines said corresponding intrinsic pattern according to foremost data of a data block located immediately after a corresponding data block.

10. The recording device according to claim 9, wherein said corresponding intrinsic pattern is "1100" when the foremost data of the data block immediately after said corresponding data block is "1," and "0011" when the foremost data of the data block immediately after said corresponding data block is "0."

11. The recording device according to claim 1, wherein said pattern determination unit selects one of a first pattern and a second pattern which is an inversion of said first pattern.

12. The recording device according to claim 1, wherein the reproduction method utilizing said inter-symbol interference is a PR (1, 1) method.

13. The recording device according to claim 1, wherein the reproduction method utilizing said inter-symbol interference is a PR (1, 2, 1) method.

14. The recording device according to claim 1, wherein prescribed information is previously recorded as a physical form on said recording medium, and
said formatter performs division into said blocks to allow said precoded data to be recorded on a recording area other than that of said physical form in said recording medium.

15. A recording device for recording data on a recording medium using a method in which data is reproduced by utilizing inter-symbol interference, comprising:
a precoder for preceding input data to adjust to said recording medium;
a formatter for dividing said precoded data into a plurality of data blocks and adding a corresponding intrinsic pattern to an end of each of said plurality of data blocks;
a pattern determination unit for determining said corresponding intrinsic pattern for the end of each of said plurality of data blocks; and
a record unit for recording an output of said formatter on said recording medium,
wherein said pattern determination unit determines said corresponding intrinsic pattern to reduce a decoding error of data at the end of each of said plurality of data blocks, and
wherein said corresponding intrinsic pattern is formed of such data among data included in a data block adjacent to a corresponding data block that is adjacent to an end of said corresponding data block before division into said blocks.

16. The recording device according to claim 15, wherein said corresponding intrinsic pattern is combined with data at an end of a corresponding data block to generate traceback.

17. The recording device according to claim 16, wherein the end of each of said plurality of data blocks is a rear end of each of said plurality of data blocks, and
foremost data of said corresponding intrinsic pattern is identical to rearmost data of said corresponding data block.

18. The recording device according to claim 16, wherein the end of each of said plurality of data blocks is a rear end of each of said plurality of data blocks, and
said corresponding intrinsic pattern is "1100" when rearmost data of said corresponding data block is "1," and "0011" when rearmost data of said corresponding data block is "0."

19. The recording device according to claim 16, wherein the end of each of said plurality of data blocks is a rear end of each of said plurality of data blocks, and
foremost data of said corresponding intrinsic pattern has at least two repetition of rearmost data of said corresponding data block.

20. The recording device according to claim 15, wherein the end of each of said plurality of data blocks is a front end of each of said plurality of data blocks, and
said pattern determination unit determines said corresponding intrinsic pattern according to rearmost data of a data block located immediately before a corresponding data block.

21. The recording device according to claim 20, wherein said corresponding intrinsic pattern is "0011" when the rearmost data of the data block located immediately before said corresponding data block is "1," and "1100" when the rearmost data of the data block located immediately before said corresponding data block is "0."

22. The recording device according to 15, wherein the end of each of said plurality of data blocks is a rear end of each of said plurality of data blocks, and
said pattern determination unit determines said corresponding intrinsic pattern according to foremost data of a data block located immediately after a corresponding data block.

23. The recording device according to claim 22, wherein said corresponding intrinsic pattern is "1100" when the foremost data of the data block immediately after said corresponding data block is "1," and "0011" when the foremost data of the data block immediately after said corresponding data block is "0."

24. The recording device according to claim 15, wherein said pattern determination unit sets as said corresponding intrinsic pattern one of a first pattern and a second pattern which is an inversion of said first pattern.

25. The recording device according to claim 15, wherein the reproduction method utilizing said inter-symbol interference is a PR (1, 1) method.

26. The recording device according to claim 15, wherein the reproduction method utilizing said inter-symbol interference is a PR (1, 2, 1) method.

27. The recording device according to claim 15, wherein prescribed information is previously recorded as a physical form on said recording medium, and said formatter performs division into said blocks to allow said precoded data to be recorded on a recording area other than that of said physical form in said recording medium.

28. A recording device for recording data on a recording medium of a method in which data is reproduced by utilizing inter-symbol interference, comprising:

a precoder for precoding input data to adjust to said recording medium, a formatter for dividing said precoded data into a plurality of data blocks and adding a corresponding first intrinsic pattern to a front end of each of said plurality of data blocks and a corresponding second intrinsic pattern to a rear end of each of said plurality of data blocks;

a pattern determination unit for determining said corresponding first intrinsic pattern and said corresponding second intrinsic pattern for each of said plurality of data blocks; and a record unit for recording an output of said format means on said recording medium, wherein said pattern determination unit determines said corresponding first intrinsic pattern according to rearmost data of a data block located immediately before a corresponding data block, and determines said corresponding second intrinsic pattern according to rearmost data of said corresponding data block.

29. The recording device according to claim 28, wherein said corresponding second intrinsic pattern is combined with the rearmost data of said corresponding data block to generate traceback.

30. The recording device according to claim 29, wherein foremost data of said corresponding second intrinsic pattern is identical to the rearmost data of said corresponding data block.

31. The recording device according to claim 28, wherein rearmost data of said corresponding first intrinsic pattern is identical to the rearmost data of the data block located immediately before said corresponding data block.

32. The recording device according to claim 28, wherein foremost data of said corresponding second intrinsic pattern has at least two repetition of the rearmost data of said corresponding data block.

33. The recording device according to claim 29, wherein foremost data of said corresponding second intrinsic pattern has at least two repetition of the rearmost data of said corresponding data block.

34. The recording device according to claim 28, wherein the reproduction method utilizing said inter-symbol interference is a PR (1, 1) method.

35. The recording device according to claim 29, wherein the reproduction method utilizing said inter-symbol interference is a PR (1, 1) method.

36. The recording device according to claim 28, wherein the reproduction method utilizing said inter-symbol interference is a PR (1, 2, 1) method.

37. The recording device according to claim 29, wherein the reproduction method utilizing said inter-symbol interference is a PR (1, 2, 1) method.

38. The recording device according to claim 28, wherein said corresponding second intrinsic pattern is "1100" when the rearmost data of said corresponding data block is "1," and "0011" when the rearmost data of said corresponding data block is "0."

39. The recording device according to claim 29, wherein said corresponding second intrinsic pattern is "1100" when the rearmost data of said corresponding data block is "1," and "0011" when the rearmost data of said corresponding data block is "0."

40. The recording device according to claim 28, wherein said corresponding first intrinsic pattern is "0011" when the rearmost data of the data block located immediately before said corresponding data block is "1," and "1100" when the rearmost data of the data block located immediately before said corresponding data block is "0."

41. The recording device according to claim 31, wherein said corresponding first intrinsic pattern is "0011" when the rearmost data of the data block located immediately before said corresponding data block is "1," and "1100" when the rearmost data of the data block located immediately before said corresponding data block is "0."

42. The recording device according to claim 28, wherein said pattern determination unit sets as said corresponding first intrinsic pattern one of a first pattern and a second pattern which is an,Aversion of said first pattern, and sets as said corresponding second intrinsic pattern one of a first pattern and a second pattern which is an inversion of said first pattern.

43. The recording device according to claim 29, wherein said pattern determination unit sets as said corresponding first intrinsic pattern one of a first pattern and a second pattern which is an inversion of said first pattern, and sets as said corresponding second intrinsic pattern one of a first pattern and a second pattern which is an inversion of said first pattern.

44. The recording device according to claim 28, wherein prescribed information is previously recorded as a physical form on said recording medium, and said formatter performs division into said blocks to allow said precoded data to be recorded on a recording area other than that of sail physical form in said recording medium.

45. The recording device according to claim 29, wherein prescribed information is previously recorded as a physical form on said recording medium, and said formatter performs division into said blocks to allow said precoded data to be recorded on a recording area other than that of said physical form in said recording medium.

* * * * *

UNITED STATES PATENT AND TRADEMARK OFFICE
CERTIFICATE OF CORRECTION

PATENT NO. : 6,377,533 B1
DATED : April 23, 2002
INVENTOR(S) : Hori et al.

It is certified that error appears in the above-identified patent and that said Letters Patent is hereby corrected as shown below:

<u>Title page,</u>
Item [30], Foreign Application Priority Data, "July 8, 1998" should be
-- August 7, 1998 --.

Signed and Sealed this

Nineteenth Day of November, 2002

Attest:

Attesting Officer

JAMES E. ROGAN
*Director of the United States Patent and Trademark Office*